United States Patent
Franke et al.

(10) Patent No.: US 9,791,275 B2
(45) Date of Patent: Oct. 17, 2017

(54) METHOD FOR CALIBRATING YAW RATE SENSORS

(71) Applicant: Robert Bosch GmbH, Stuttgart (DE)

(72) Inventors: Axel Franke, Wannwweil (DE); Mirko Hattass, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 392 days.

(21) Appl. No.: 14/059,217

(22) Filed: Oct. 21, 2013

(65) Prior Publication Data

US 2014/0116108 A1  May 1, 2014

(30) Foreign Application Priority Data

Oct. 25, 2012 (DE) .................. 10 2012 219 507

(51) Int. Cl.
*G01C 25/00* (2006.01)
*G01C 19/5755* (2012.01)

(52) U.S. Cl.
CPC ....... *G01C 19/5755* (2013.01); *G01C 25/005* (2013.01)

(58) Field of Classification Search
CPC ........ G01P 21/00; G01C 25/00; G01C 25/005
USPC .......................................... 73/1.37
See application file for complete search history.

(56) References Cited

U.S. PATENT DOCUMENTS

| | | | |
|---|---|---|---|
| 5,859,774 A * | 1/1999 | Kuzuya et al. | 700/71 |
| 2011/0167891 A1 | 7/2011 | Geen | |
| 2013/0233048 A1 * | 9/2013 | Anac et al. | 73/1.77 |

* cited by examiner

*Primary Examiner* — Peter Macchiarolo
*Assistant Examiner* — Alexander Mercado
(74) *Attorney, Agent, or Firm* — Norton Rose Fulbright US LLP; Gerard Messina

(57) ABSTRACT

A method for calibrating a selected yaw rate sensor includes: determining a scaling function between a yaw rate sensitivity and a test signal sensitivity of a yaw rate sensor selected for carrying out a test and denoted as first sampling yaw rate sensor is determined in a first method step, the scaling function being determined from a measured first sample yaw rate sensitivity and from a measured first sample test signal sensitivity of the sampling yaw rate sensor; calculating a production yaw rate sensitivity for a yaw rate sensor denoted as production yaw rate sensor from a measured production test signal sensitivity of the production yaw rate sensor and the scaling function; and subsequently calibrating the production yaw rate sensor with the aid of the production yaw rate sensitivity.

4 Claims, 1 Drawing Sheet

METHOD FOR CALIBRATING YAW RATE SENSORS

BACKGROUND OF THE INVENTION

1. Field of the Invention

The present invention relates to a method for calibrating yaw rate sensors.

2. Description of the Related Art

Such methods for calibrating yaw rate sensors are generally known. The measuring principle for yaw rate sensors is the use of the Coriolis effect. For that purpose, a seismic mass of the sensor structure is put into a drive oscillation in a drive direction. In the case of an external yaw rate occurring perpendicularly to the direction of the drive oscillation, Coriolis forces occur which cause a detection oscillation into a detection direction of the seismic mass. Imperfections in the mechanical sensor structure may result in cross-couplings of the drive oscillation and the detection oscillation. The cause of this cross-coupling is displacement proportional and is denoted as quadrature.

Process variations in the manufacturing process of yaw rate sensors may disadvantageously result in a variation of the sensitivity of the yaw rate sensors. In conventional methods, the sensitivities of the micromechanical yaw rate sensors are calibrated by applying a yaw rate to each of the yaw rate sensors. Special devices are needed for this purpose, which is disadvantageously associated with a very time-intensive and cost-intensive calibrating method.

An alternative method for calibrating micromechanical inertial sensors, in particular yaw rate sensors, is known, for example, from US Patent Application Publication No. 2011/0167891, according to which the sensitivity of an inertial sensor is determined based on the resonance frequencies of a primary oscillator and a secondary oscillator as well as the quality of the detection mode. Compared to a calibrating method in which a yaw rate is applied to yaw rate sensors, this method disadvantageously results in a lower calibrating accuracy.

BRIEF SUMMARY OF THE INVENTION

An object of the present invention is therefore to provide a method for determining the sensitivity of a plurality of yaw rate sensors to be calibrated from individual measurements of a smaller number of yaw rate sensors referred to as sampling yaw rate sensors, which does not exhibit the disadvantages of the related art and makes it possible to calibrate a plurality of yaw rate sensors to be calibrated without causing mechanical movements of all these yaw rate sensors with a simultaneously high calibrating accuracy. This provides a significantly faster and more economical production process of the finished yaw rate sensors.

In contrast to the related art, the method according to the present invention for calibrating yaw rate sensors has the advantage that it does not have the disadvantages of the related art and makes it possible to calibrate yaw rate sensors without applying a yaw rate to all of these yaw rate sensors to be calibrated. Furthermore, it is advantageously possible to achieve an additional improvement of the calibrating accuracy compared to the related art by using atest signal.

According to a preferred refinement, it is provided that in the first method step, the scaling function is additionally determined from a measured second sample test signal sensitivity and a measured second sample yaw rate sensitivity of a second sampling yaw rate sensor, the scaling function being determined as a function of a first and second sample drive frequency and/or sample detection frequency, and in the second method step, the production yaw rate sensitivity is calculated for the production yaw rate sensor from the measured production test signal sensitivity, a measured production drive frequency and/or a measured production detection frequency and the value of the scaling function, the scaling function being calculated as a function of the measured production drive frequency and/or the measured production detection frequency, the scaling function being interpreted as linear as a function of the production drive frequency and/or the production detection frequency. This makes it advantageously possible to achieve a higher calibrating accuracy in that the scaling function is determined as a function of an increasing number of sampling points and/or the standard measuring inaccuracy is reduced.

According to another preferred refinement, it is provided that a quadrature signal in particular is used as a test signal for determining the test signal sensitivity. This makes it advantageously possible to apply a quadrature signal to the test device, so that with the aid of a forced miscalibration, quadrature forces are generated parallel to the detection direction for compensating quadrature disturbance variables which occur due to manufacturing-related imperfections in the sensor structure during excitation of the drive oscillation and are superposed on the detection movement of the seismic mass.

According to another preferred refinement, it is provided that for measuring the first and second sample yaw rate sensitivity, the axis of rotation extends perpendicularly to the main plane of extent, and for measuring an additional first sample yaw rate sensitivity of the first sampling yaw rate sensor, an additional axis of rotation extends parallel to the main plane of extent and perpendicularly to the axis of rotation. This makes it advantageously possible to determine the sample yaw rate sensitivity pattern of yaw rate sensors having sensitivity about the axis of rotation and about the additional axis of rotation, and thus further simplify and improve the calibrating method of yaw rate sensors significantly.

According to another preferred refinement, it is provided that in the case of yaw rate sensors having sensitivity about the axis of rotation and the additional axis of rotation, in the first method step, an additional scaling function is additionally determined for the first sampling yaw rate sensor between the test signal sensitivity, the yaw rate sensitivity, an additional test signal sensitivity and an additional yaw rate sensitivity from the measured first sample test signal sensitivity and the measured first sample yaw rate sensitivity and from a measured additional first sample test signal sensitivity and a measured additional first sample yaw rate sensitivity, and in the second method step, an additional production yaw rate sensitivity is additionally calculated for the production yaw rate sensor from the calculated production yaw rate sensitivity, the additional scaling function, the measured production test signal sensitivity and a measured additional production test signal sensitivity, and the production yaw rate sensor is subsequently adjusted with the aid of the additional production yaw rate sensitivity. This makes it advantageously possible to calibrate a large number of yaw rate sensors having sensitivity about more than one axis of rotation in a particularly simple and improved manner in contrast to the related art, in particular without applying a yaw rate to the yaw rate sensors.

Exemplary embodiments of the present invention are represented in the drawings and are elucidated in greater detail in the following description.

DETAILED DESCRIPTION OF THE INVENTION

Figure 1:
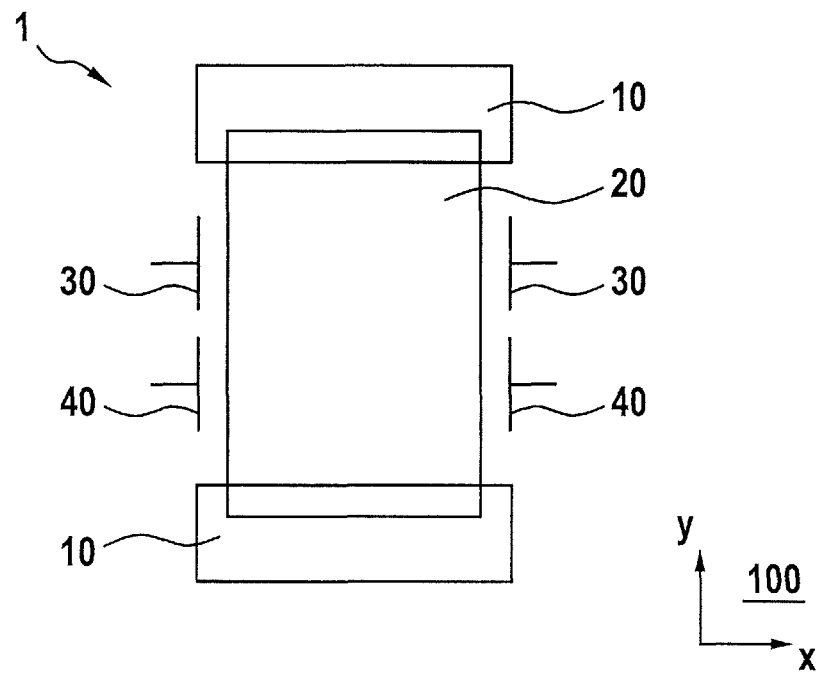
FIG. 1 shows schematic diagrams of an exemplary embodiment of the yaw rate sensors according to the present invention.

Identical components are consistently provided with the same reference numerals in the various drawings and are therefore named or mentioned only once.

FIG. 1 shows a schematic diagram of an exemplary specific embodiment of yaw rate sensor 1 according to the present invention. A substrate, which is not shown, has a main plane of extent 100. Yaw rate sensor 1 includes a drive device 10, which is provided for the capacitive vibrational excitation of a seismic mass 20 which is movable in relation to the substrate in the Y direction (drive direction). If a yaw rate about an axis of rotation extending perpendicularly to main plan of extent 100 is applied to yaw rate sensor 1, the Coriolis force causes a force action on the seismic mass in a detection direction parallel to the X-direction. In a so-called open-loop system, the seismic mass is deflected due to the Coriolis force, while in a so-called closed-loop system, the force action is compensated with the aid of an electrostatic counterforce caused by the detection device. For detecting the force action in the X-direction, yaw rate sensor 1 includes a detection device 30, which preferably has capacitive measuring electrodes, in particular finger electrodes. Furthermore, yaw rate sensor 1 has a test device 40, to which a test signal is applied in order to generate a force action on the seismic mass in the X-direction (detection direction).

Due to process variations, in particular in etching processes, the manufacturing process of the yaw rate sensors may be accompanied by a variation of length dimensions of individual components in one dimension parallel to main plane of extent 100; this includes, for example, spring beam widths used for suspending the seismic mass under oscillation, and distances between electrode fingers of a yaw rate sensor. This change in the length dimensions is collectively referred to as edge loss. The resonance frequency of the drive movement is related to the spring stiffness across the spring bar width. If the resonance frequency of the drive movement is selected as drive frequency $\omega_{drive}$ the drive frequency must therefore be interpreted as a measure of the edge loss.

The calibrating method for a plurality of production yaw rate sensors to be calibrated, and in this connection not to be acted on by a yaw rate, is based on a one-time determination of a scaling function which is fixed for a given design from a smaller number of sampling yaw rate sensors. From the scaling function, a yaw rate sensitivity is subsequently calculated for each of these production yaw rate sensors with the aid of a measured test signal and a measured drive frequency. The calculated yaw rate sensitivity is subsequently used for calibrating the particular production yaw rate sensor.

The relationship between the yaw rate sensitivity with respect to a rotational movement about a rotational axis parallel to the Z-direction and the test signal sensitivity has been found empirically and is shown in equation (1).

$$dU_{out}/d\Omega_z = f(\omega_{drive}) \cdot dU_{out}/dU^2_{quad} \tag{1}$$

In this connection, $\Omega_z$ is a yaw rate about the axis of rotation parallel to the Z-direction; $U_{out}$ is an output voltage measured on the detection device for determining a yaw rate sensitivity or a test signal sensitivity; $U^2_{quad}$ is an input voltage denoted as a test signal applied to the test device; $\omega_{drive}$ is a drive frequency used to drive the seismic mass resonantly and $f(\omega_{drive})$ is a scaling function between a yaw rate sensitivity and a test signal sensitivity, the scaling function being determined from extensive simulations and/or from measurements for a number of sampling yaw rate sensors which is necessary for a certain calibrating accuracy.

In the first method step, a yaw rate, $\Omega_z$, about an axis of rotation parallel to the Z-direction is applied to a first sampling yaw rate sensor selected from the smaller number of sampling yaw rate sensors. This results in a sample yaw rate sensitivity on the output of detection device 30 as a change of output voltage, $U_{out}$, per capacitance change, capacitance change per deflection, deflection per Coriolis force and finally Coriolis force per yaw rate, $\Omega_z$. In a similar manner, a sample test signal sensitivity is obtained based on the force action of test device 40 per applied input voltage, $U^2_{quad}$, which is also denoted as a test signal, a quadrature signal preferably being used as the test signal. Test device 40 generates a force on the seismic mass modulated in the detection direction using the drive movement of the seismic mass.

Furthermore, a first sample drive frequency is measured on the drive device of the first sampling yaw rate sensor. From the first sample yaw rate sensitivity and the first sample test signal sensitivity of the first sampling yaw rate sensor, a first value of the scaling function is determined at the point of the measured first sample drive frequency. In a similar manner, a second value of the scaling function is determined at the point of a measured second sample drive frequency using a second sampling yaw rate sensor. A scaling function between a yaw rate sensitivity and a test signal sensitivity as a function of a drive frequency is determined from the first and second value of the scaling function, and the associated first and second sample drive frequency. Preferably, the scaling function is determined from a regression line, which is preferably obtained with the aid of at least two sampling yaw rate sensors, preferably, however with the aid of a larger number of sampling yaw rate sensors.

In the second method step, the production yaw rate sensitivities are calculated from the measured production test signal sensitivities of the plurality of production yaw rate sensors to be calibrated, the scaling function determined at the points of the production drive frequencies being evaluated in the first method step with the aid of a smaller number of sampling yaw rate sensors being used. The number of sampling yaw rate sensors is geared, for example, to a certain required calibrating accuracy. Subsequently, the production yaw rate sensors are calibrated with the aid of the production yaw rate sensitivities.

Figure 2:
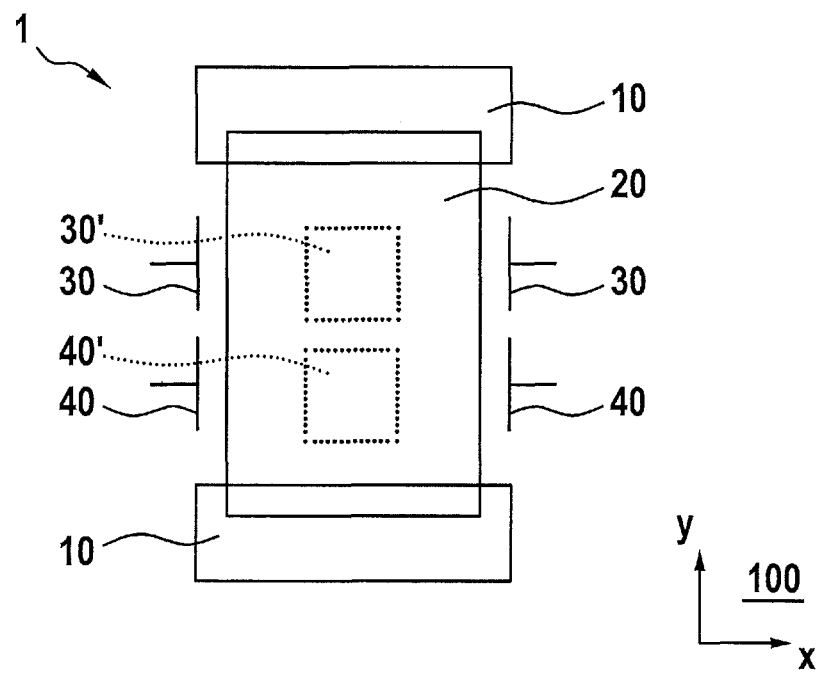
FIG. 2 shows schematic diagrams of another exemplary embodiment of the yaw rate sensors according to the present invention.

FIG. 2 shows another exemplary specific embodiment of yaw rate sensor 1 according to the present invention. Yaw rate sensor 1, including drive device 10, seismic mass 20, which is movable in relation to main plain of extent 100, detection device 30 and test device 40, has, in addition to sensitivity with respect to a rotational movement about the first axis of rotation parallel to the Z-direction, sensitivity with respect to a rotational movement about an additional axis of rotation parallel to the X-direction. If a yaw rate, $\Omega_x$, is additionally applied to yaw rate sensor 1 about the additional axis of rotation, the Coriolis force causes a force action of the seismic mass into a detection direction parallel to the Z-direction. For detecting the force action in the Z-direction, yaw rate sensor 1 has an additional detection device 30'. An additional output voltage $U'_{out}$ is measured on additional detection device 30', from which an additional yaw rate sensitivity is determined. Furthermore, yaw rate sensor 1 has an additional test device 40', to which an additional test signal, $U'^2_{quad}$, is applied in order to generate a force action on the seismic mass in the Z-direction, from which an additional test signal sensitivity is determined.

For yaw rate sensor 1 according to the additional specific embodiment having sensitivity about the additional axis of rotation parallel to the X-direction, an additional relationship, which is found empirically, may be used for a significantly simplified and improved calibration of the additional yaw rate sensitivity. In addition to the calibration of the yaw rate sensitivity with respect to a rotational movement about the axis of rotation, a calibration of the additional yaw rate sensitivity is carried out with respect to the additional axis of rotation. The additional yaw rate sensitivity is calculated from the yaw rate sensitivity, an additional scaling function to be determined one time, the measured production test signal sensitivity and an additional production test signal sensitivity. This relationship is shown in equation (2).

$$\frac{dU'_{out}}{d\Omega_x} = \sqrt{\frac{\frac{dU'_{out}}{dU'^2_{quad}}}{\frac{dU_{out}}{dU^2_{quad}}}} \, f'(\omega_{drive}, \omega_{Det}) \frac{dU_{out}}{d\Omega_z} \qquad (2)$$

In this case, $\Omega_x$ is a yaw rate about an additional axis of rotation parallel to the X-direction; $U'_{out}$ is an output voltage measured on additional detection device 30' for determining an additional yaw rate sensitivity or an additional test signal sensitivity; $U'^2_{quad}$ is an input voltage denoted as an additional test signal applied to additional test device 40'; $\Omega_{drive}$ is a drive frequency used for driving the seismic mass resonantly; $\omega_{Det}$ is a detection frequency measured on additional detection device 30' and f' ($\omega_{drive}$, $\omega_{Det}$) is an additional scaling function between a yaw rate sensitivity, a test signal sensitivity, an additional yaw rate sensitivity and an additional test signal sensitivity.

In addition to the method according to the first specific embodiment, the following steps are carried out for the yaw rate sensor having sensitivity about the additional axis of rotation. A yaw rate, $\Omega_x$, about the X-direction is applied to the first sampling yaw rate sensor about the X-direction in order to measure an additional first sample yaw rate sensitivity. Subsequently, an additional test signal on the additional test device is applied to the sampling yaw rate sensor in order to determine an additional first sample test signal sensitivity. In addition, a sample detection frequency is measured. From the additional first sample yaw rate sensitivity and the additional first sample test signal sensitivity of the first sampling yaw rate sensor, a first value of the additional scaling function is determined at the point of the measured first sample drive frequency and the measured sample detection frequency. In a similar manner, a second value of the scaling function is determined at the point of a measured second sample drive frequency using a second sampling yaw rate sensor and a measured second sample detection frequency. A scaling function between a yaw rate sensitivity, a test signal sensitivity, an additional yaw rate sensitivity and an additional test signal sensitivity are determined from the first and second values of the scaling function, the first and additional first sample drive frequency as well as the detection frequency and the additional detection frequency as a function of a drive frequency and a detection frequency. Preferably, the additional scaling function is determined in each case from a regression line for the dependency on a drive frequency and for the dependency on a detection frequency, the regression line being obtained with the aid of at least two sampling yaw rate sensors, preferably, however, from a larger number of sampling yaw rate sensors.

In the second method step, the additional production yaw rate sensitivity of the particular production yaw rate sensor according to equation (2) is additionally calculated for each of the plurality of production yaw rate sensors, the calculation being based on the production yaw rate sensitivity, the value of the additional scaling function at the point of the production drive frequency and production detection frequency, the measured production test signal sensitivity and the measured additional production test signal sensitivities. Subsequently, each of the production yaw rate sensors is calibrated with the aid of the calculated additional production yaw rate sensitivity.

The method according to the present invention may be used for calibrating all micromechanical yaw rate sensors, such as, for example, for consumer and automotive applications. The method according to the present invention is in particular suitable for calibrating yaw rate sensors operated in the detection as open-loop systems, the deflection of the seismic mass in the detection direction being measured, as well as those operated partially resonantly, only the drive device being operated resonantly.

What is claimed is:

1. A method for calibrating a production yaw rate sensor selected from a plurality of yaw rate sensors, the plurality of yaw rate sensors including a substrate having a main plane of extent, a seismic mass movable in relation to the substrate, a drive device for deflecting the seismic mass in a drive direction, a detection device for detecting a force action of the seismic mass in a detection direction perpendicular to the drive direction, and a test device for deflecting the seismic mass parallel to the detection direction, the method comprising:

measuring a production drive frequency on the drive device of the production yaw rate sensor;

measuring a production detection frequency on the detection device of the production yaw rate sensor;

applying a yaw rate about an axis of rotation to a first sampling yaw rate sensor designated from the plurality of yaw rate sensors for measuring a first sample yaw rate sensitivity, and measuring an output voltage on the detection device of the first sampling yaw rate sensor as a function of the yaw rate;

applying a test signal to the test device of the production yaw rate sensor for measuring a test signal sensitivity of the production yaw rate sensor, and measuring a detection voltage on the detection device of the production yaw rate sensor as a function of the test signal applied to the test device of the production yaw rate sensor, wherein the test signal is applied to the test device of the production yaw rate sensor to generate the force action on the seismic mass in a detection direction;

calculating a production yaw rate sensitivity for the production yaw rate sensor from the measured production test signal sensitivity of the production yaw rate sensor and a scaling function, wherein the scaling function is determined from the measured first sample yaw rate sensitivity and from a measured first sample test signal sensitivity of the first sampling yaw rate sensor; and calibrating the production yaw rate sensor with the production yaw rate sensitivity;

wherein a quadrature signal is used as the test signal for measuring the production test signal sensitivity, and wherein the test device generates the force action on the seismic mass modulated in the detection direction using a drive movement of the seismic mass.

2. The method as recited in claim 1, wherein a second sampling yaw rate sensor is designated from the plurality of yaw rate sensors, and wherein:

the scaling function is additionally determined from a measured second sample test signal sensitivity and a measured second sample yaw rate sensitivity of the second sampling yaw rate sensor, the scaling function being additionally determined as a function of at least one of (i) a first and second sample drive frequency and (ii) a first and second sample detection frequency;

the production yaw rate sensitivity is calculated for the production yaw rate sensor from the measured production test signal sensitivity, a value of the scaling function, and at least one of the measured production drive frequency and the measured production detection frequency;

the scaling function is calculated as a function of at least one of the measured production drive frequency and the measured production detection frequency; and the scaling function is interpreted linearly as a function of at least one of the production drive frequency and the production detection frequency.

3. The method as recited in claim 2, wherein:

for measuring the first and second sample yaw rate sensitivity, the axis of rotation extends perpendicularly to the main plane of extent; and for measuring an additional first sample yaw rate sensitivity of the first sampling yaw rate sensor, an additional axis of rotation extends parallel to the main plane of extent and perpendicularly to the axis of rotation.

4. The method as recited in claim 2, wherein the production yaw rate sensor has a sensitivity about the axis of rotation and an additional axis of rotation:

an additional scaling function is determined for the first sampling yaw rate sensor between a first sample test signal sensitivity, the first sample yaw rate sensitivity, an additional test signal sensitivity, and an additional yaw rate sensitivity from the measured first sample test signal sensitivity and the measured first sample yaw rate sensitivity and from a measured additional first sample test signal sensitivity and a measured additional first sample yaw rate sensitivity;

an additional production yaw rate sensitivity is calculated for the production yaw rate sensor from the calculated production yaw rate sensitivity, the additional scaling function, the measured production test signal sensitivity and a measured additional production test signal sensitivity; and the production yaw rate sensor is subsequently calibrated with the additional production yaw rate sensitivity.

* * * * *